US007539353B2

(12) United States Patent
Kawada (10) Patent No.: US 7,539,353 B2
(45) Date of Patent: May 26, 2009

(54) IMAGE PROCESSING APPARATUS AND IMAGE PROCESSING PROGRAM

(75) Inventor: Yukihiro Kawada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 422 days.

(21) Appl. No.: 11/158,069

(22) Filed: Jun. 22, 2005

(65) Prior Publication Data
US 2006/0007501 A1 Jan. 12, 2006

(30) Foreign Application Priority Data
Jul. 6, 2004 (JP) ............................. 2004-199324

(51) Int. Cl.
*G06K 9/40* (2006.01)
(52) U.S. Cl. ....................... 382/274; 382/254
(58) Field of Classification Search .................. 382/254
See application file for complete search history.

(56) References Cited

U.S. PATENT DOCUMENTS

| | | | | | |
|---|---|---|---|---|---|
| 4,522,491 | A | * | 6/1985 | Ingalls et al. .................. 355/77 |
| 4,703,511 | A | * | 10/1987 | Conoval ...................... 382/182 |
| 4,724,543 | A | * | 2/1988 | Klevecz et al. ............... 382/133 |
| 5,144,685 | A | * | 9/1992 | Nasar et al. .................. 382/153 |
| 5,280,363 | A | * | 1/1994 | Nakamura et al. .......... 386/119 |
| 5,771,070 | A | * | 6/1998 | Ohzu et al. .................. 348/241 |
| 5,809,161 | A | * | 9/1998 | Auty et al. .................. 382/104 |
| 5,838,465 | A | * | 11/1998 | Satou et al. .................. 358/520 |
| 6,233,347 | B1 | * | 5/2001 | Chen et al. .................. 382/100 |
| 6,832,221 | B2 | * | 12/2004 | Takahashi ...................... 707/6 |
| 7,035,406 | B2 | * | 4/2006 | Machida et al. ............... 380/30 |
| 2001/0036231 | A1 | * | 11/2001 | Easwar et al. .......... 375/240.19 |
| 2002/0061136 | A1 | * | 5/2002 | Shibata et al. ............... 382/199 |
| 2002/0161582 | A1 | * | 10/2002 | Basson et al. ............... 704/260 |
| 2002/0196340 | A1 | * | 12/2002 | Kato et al. .................. 348/148 |
| 2002/0196962 | A1 | * | 12/2002 | Fukuhara et al. ............ 382/103 |
| 2003/0103061 | A1 | * | 6/2003 | Blish et al. .................. 345/619 |
| 2004/0101212 | A1 | * | 5/2004 | Fedorovskaya et al. ..... 382/305 |

(Continued)

FOREIGN PATENT DOCUMENTS

JP 2001103431 A * 4/2001

(Continued)

OTHER PUBLICATIONS

Agary, David, Inside Adobe Photoshop 4, 1997, New Rider Publisher, p. 565-572, ISBN 1-56205-800-2.*

*Primary Examiner*—Jingge Wu
*Assistant Examiner*—Tsung-Yin Tsai
(74) *Attorney, Agent, or Firm*—Birch, Stewart, Kolasch & Birch, LLP (57) ABSTRACT

The image processing apparatus of the present invention comprises an image acquisition device that acquires image data from an image recording device on which the image data was recorded, a date and time information reading device that reads date and time information of the image data, an image display device that displays a reproduced image of the image data, an image selection device that selects image data displayed on the image display device, and an image data processing device that, based on the date and time information that was acquired by the date and time information reading device, performs predetermined processing on the reproduced image in accordance with a period of elapsed time since the date and time that the image data was captured.

16 Claims, 7 Drawing Sheets

U.S. PATENT DOCUMENTS

2004/0183918 A1* 9/2004 Squilla et al. ............ 348/211.2
2004/0223649 A1* 11/2004 Zacks et al. ................. 382/218
2005/0212817 A1* 9/2005 Cannon et al. .............. 345/619

FOREIGN PATENT DOCUMENTS

JP 2002-330328 A 11/2002
JP 2003-085007 A 3/2003

* cited by examiner

IMAGE PROCESSING APPARATUS AND IMAGE PROCESSING PROGRAM

BACKGROUND OF THE INVENTION

1. Field of the Invention

The present invention relates to an image processing apparatus and an image processing program, and more particularly to an image processing apparatus and an image processing program which store digital images.

2. Related Art

Technology has already been developed for saving recording capacity in devices which record image data. For example, Japanese Patent Application Laid-open No. 2002-330328 discloses an electronic imaging camera which comprises a nonvolatile storage device that stores captured image data and a wireless communication device that transmits image data to an external storage device by wireless communication, wherein image data is erased from the storage device after it has been completely transferred.

Further, Japanese Patent Application Laid-open No. 2003-85007 discloses a method for degrading digital information which reduces the amount of information stored in a computing machine by determining the level of importance information that was associated with information stored in the computing machine and then reducing the information amount based on the result of determining the level of importance.

SUMMARY OF THE INVENTION

In recent years the use of personal computers and digital cameras and the like has become widespread, and captured image data can now be readily managed in the home or the like. Further, the increase in capacity of storage media such as hard disks and memory cards in recent years has made it possible for users to store large amounts of image data. However, there is a problem that it is difficult to keep large amounts of image data in order and image data required by a user may be buried amongst a large amount of image data and be difficult for the user to find.

The electronic imaging camera disclosed in the aforementioned Japanese Patent Application Laid-open No. 2002-330328 is a device for ensuring the free space of a camera by transmitting image data to an external storage device and then erasing the data in the camera, and the object and configuration thereof are different to those of the present invention. Further, the method for degrading digital information disclosed in the aforementioned Japanese Patent Application Laid-open No. 2003-85007 is a method that erases all or a part of information, decreases the amount of image data, or changes a storage location in accordance with the level of importance or the like of information stored in a computing machine, and is different in configuration to the present invention.

The present invention is made in view of the foregoing circumstances, and it is an object of the present invention to provide an image processing apparatus and image processing program that can facilitate the management of image data and the like.

In order to achieve the above object, an image processing apparatus according to a first aspect of the present invention comprises an image acquisition device that acquires image data from an image recording device on which the image data was recorded; a date and time information reading device that reads date and time information of the image data; an image display device that displays a reproduced image of the image data; an image selection device that selects image data that was displayed on the image display device; and an image data processing device that, based on the date and time information that was acquired by the date and time information reading device, performs predetermined processing on the reproduced image in accordance with the period of elapsed time from the date and time the image data was captured.

According to the image processing apparatus of the first aspect, since predetermined processing is performed on a reproduced image in accordance with whether the age of the image data, processing of image data is facilitated.

An image processing apparatus according to a second aspect of the present invention comprises an image recording device that records image data; a date and time information reading device that reads date and time information of the image data; an image data processing device that, based on the date and time information that was acquired by the date and time information reading device, conducts predetermined processing on the image data in accordance with the period of elapsed time from the date and time the image data was captured; and an image re-recording device that causes image data that underwent the predetermined processing to be re-recorded by the image recording device.

An image processing apparatus according to a third aspect of the present invention is an apparatus according to the first or second aspect, wherein the image data processing device performs on the reproduced image or the image data at least one kind of processing selected from the group including: processing that applies a sepia or gray filter to the reproduced image or the image data; discoloration processing; processing that alters the lightness, saturation, hue, resolution, or contrast; and processing that compresses, reduces, or applies traces of vermiculation, or spots or crosses or the like to the reproduced image or the image data.

According to the image processing apparatus of the third aspect, in addition to the effect described above, by executing processing that, as with an ordinary print, makes a digital image appear as if it has decayed over time in accordance with the period of elapsed time of the reproduced image or image data, it is possible for a user to enjoy changes accompanying the passage of time even for digital images.

An image processing apparatus according to a fourth aspect of the present invention is an apparatus according to the first to third aspects, wherein when image data was selected by the image selection device, the date and time information reading device reads date and time information of the selected image data, and the image data processing device performs processing on the reproduced image or the image data based on the date and time information of the selected image data.

Further, an image processing apparatus according to a fifth aspect of the present invention is an apparatus according to the first to fourth aspects, further comprising an audio data recording device that records audio data that was associated with the image data; an audio output device that outputs audio data that was associated with the image data during display of a reproduced image of the image data; and an audio processing device that performs predetermined processing of audio data in accordance with the period of elapsed time from the date and time the image data was captured, based on date and time information acquired by the date and time information reading device.

According to the image processing apparatus of the fifth aspect, an effect of decaying over time can also be added to sound associated with dynamic image or static image data, similarly to images, enabling a user to enjoy changes accompanying the passage of time for digital sound also.

An image processing apparatus according to a sixth aspect of the present invention is an apparatus according to the fifth aspect, wherein the audio processing device changes at least one element selected from the group including sound volume and sound pitch.

An image processing apparatus according to a seventh aspect of the present invention is an apparatus according to the fifth or sixth aspect, wherein when image data was selected by the image selection device, the audio processing device conducts predetermined processing on the audio output.

An image processing apparatus according to an eighth aspect of the present invention comprises an image recording device that records image data; a date and time information reading device that reads date and time information of the image data; and an image erasing device that erases the image data in accordance with the period of elapsed time since the date and time the image data was captured, based on the date and time information that was acquired by the date and time information reading device.

According to the image processing apparatus of the eighth aspect, since it is possible to automatically erase images that have become old, it is easier for the user to arrange image data and, at the same time, to effectively utilize recording media.

An image processing apparatus according to the ninth aspect of the present invention is an apparatus according to the eighth aspect, wherein the image erasing device erases the image data when the power of the image processing apparatus is turned on or off, or when an image has been newly stored.

According to the image processing apparatus of a ninth aspect, image data can be arranged in accordance with the frequency of utilization of the apparatus, providing convenience for the user.

An image processing apparatus according to a tenth aspect of the present invention is an apparatus according to the first to ninth aspects, further comprising a documentation data recording device that records documentation data; and a data processing device that performs predetermined processing on the documentation data or erases the documentation data in accordance with the period of elapsed time since the date and time the documentation data was stored, based on date and time information acquired by the date and time information reading device.

According to the image processing apparatus of the tenth aspect, an effect of decaying over time can also be added to documentation data and the like that was created by an ordinary application, making it easier for the user to arrange data and, at the same time, enabling the user to enjoy changes accompanying the passage of time for digital data also.

Further, an image processing program according to an eleventh aspect of the present invention causes a computer to implement the functions of: acquiring image data from an image recording device on which the image data is recorded; reading date and time information of the image data; displaying a reproduced image of the image data; selecting the displayed image data; and performing predetermined processing on the reproduced image in accordance with the period of elapsed time since the date and time the image data was captured, based on the date and time information that was read.

An image processing program according to a twelfth aspect of the present invention causes a computer to implement the functions of: recording image data; reading date and time information of the image data; performing predetermined processing on the image data in accordance with the period of elapsed time since the date and time that the image data was captured, based on the date and time information that was read; and re-recording the image data that underwent the predetermined processing.

An image processing program according to a thirteenth aspect of the present invention causes a computer to implement the functions of: recording image data; reading date and time information of the image data; and erasing the image data in accordance with the period of elapsed time since the date and time that the image data was captured, based on the date and time information that was read.

According to the present invention, since predetermined processing, for example processing that adds an effect of decaying over time or the like, is performed on a reproduced image in accordance with the age of the image data, processing of the image data is facilitated and, at the same time, a user can enjoy the effect of images or sound decaying over time even for digital data. Further, by automatically erasing old data the invention enables the effective utilization of recording media.

DETAILED DESCRIPTION OF THE PREFERRED EMBODIMENTS

Figure 1:
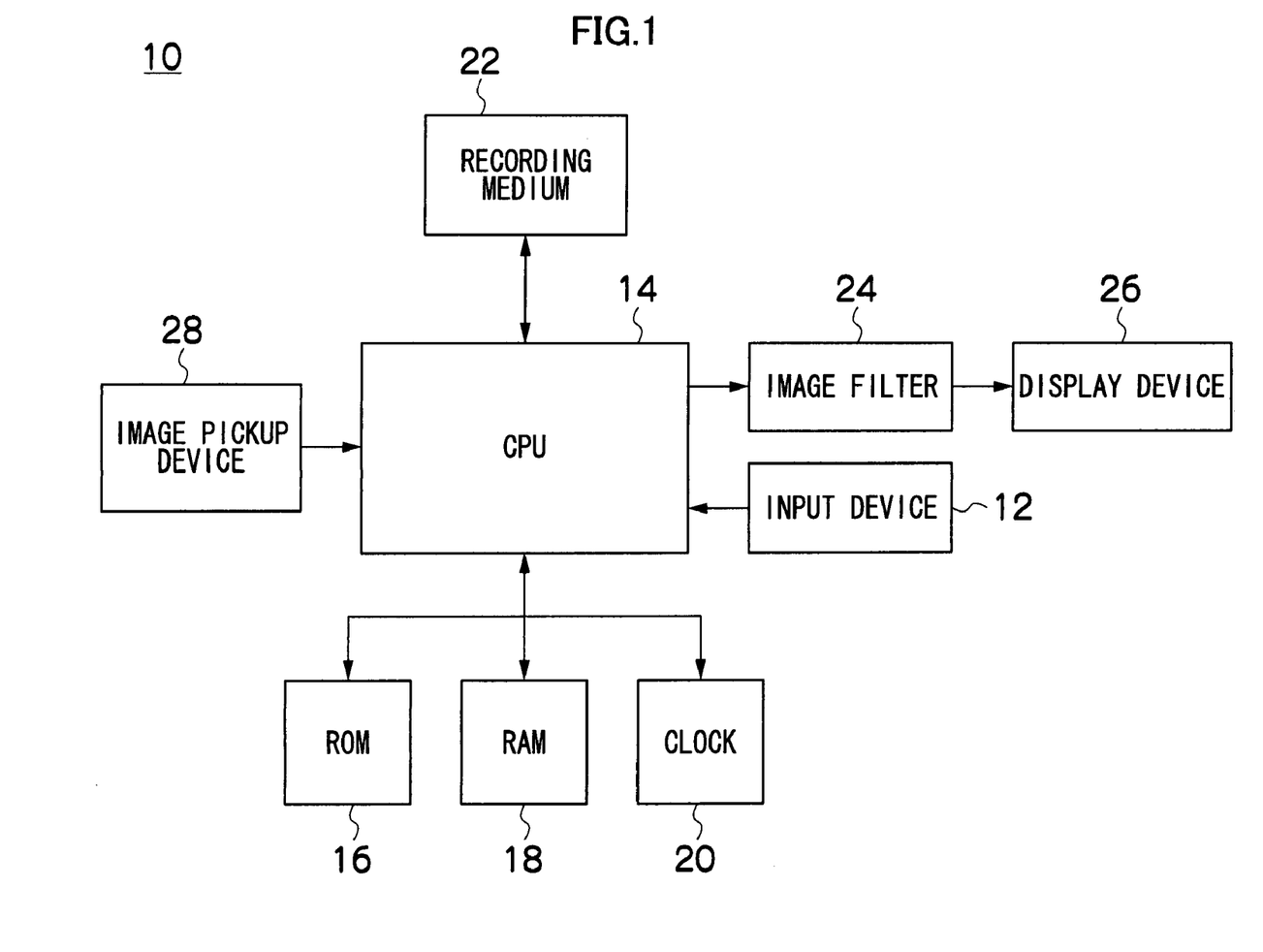
FIG. 1 is a block diagram showing the image processing apparatus of the first embodiment of the present invention.

Hereunder, preferred embodiments of the image processing apparatus and image processing program of the present invention are described referring to the attached drawings. FIG. 1 is a block diagram showing the image processing apparatus of the first embodiment of the present invention.

An image processing apparatus 10 shown in FIG. 1 is a digital camera. The image processing apparatus 10 comprises an input device 12, a CPU 14, a ROM 16, a RAM 18, a clock 20, a recording medium 22, a display device 26 that is connected to a CPU 14 through an image filter 24, and an image pickup device 28.

The input device 12 is a device to enable an operator to input operating instructions, and it includes various operation buttons and a power switch and the like.

The CPU 14 is a control unit which carries out unified control of the image processing apparatus 10. The CPU 14 controls the operation of the various devices of the image processing apparatus 10 in accordance with instructions input from the input device 12 and the like.

The ROM (Read Only Memory) 16 is a device which includes a storage area in which programs processed by the CPU 14 and various data required for control operations are stored.

The RAM (Random Access Memory) 18 is a device which includes a temporary storage area in which image data acquired by the image pickup device 28 is stored and a working area in which the CPU 14 performs various kinds of processing and the like.

The recording medium 22 is a device in which image data received from the image pickup device 28 is stored, and examples thereof include an xD-picture card and a Compact Flash (CF) Card (registered trademark).

The image filter 24 is a device for converting image data stored on the recording medium 22 into an image for reproducing or a thumbnail display image, as well as for performing predetermined processing on a reproduced image.

The display device 26 is a device for displaying an image, and examples thereof include a liquid crystal display (LCD) and an organic EL.

Figure 2:
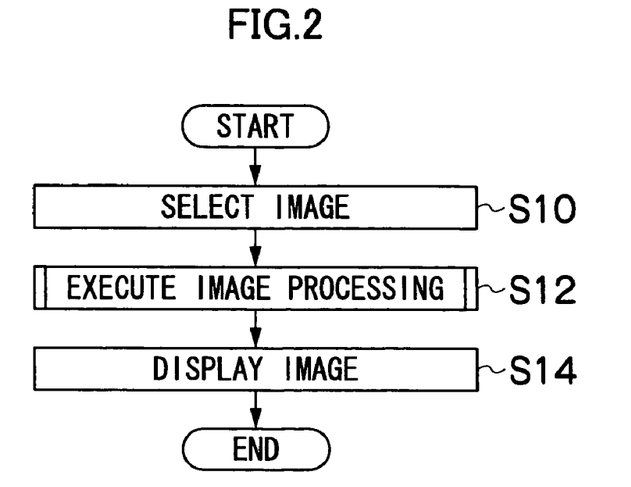
FIG. 2 is a flowchart illustrating the image processing method of the first embodiment of the present invention.

Next, a method for processing image data using the image processing apparatus 10 will be described. FIG. 2 is a flowchart illustrating the image processing method of the first embodiment of the present invention.

First, image data displayed on the display device 26 is selected by the input device 12 (step S10), and then the image processing process proceeds to step S12.

Figure 3:
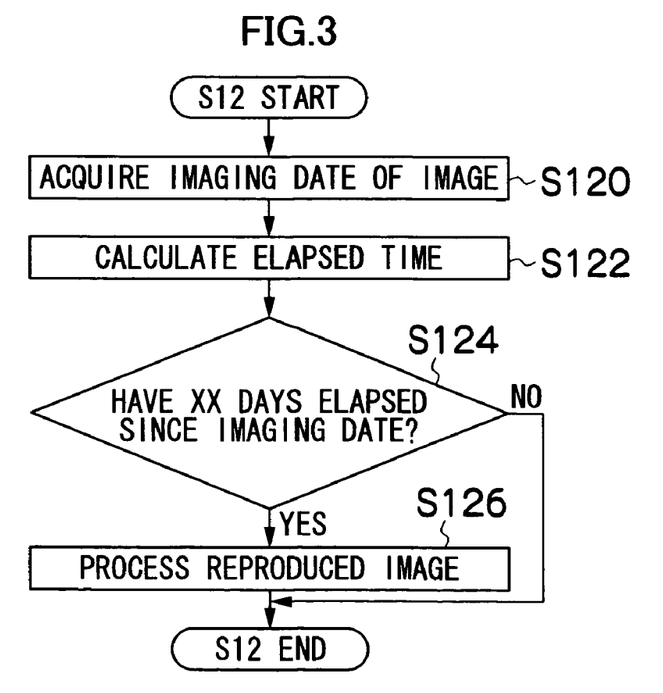
FIG. 3 is a flowchart illustrating the image processing process of step S12.

FIG. 3 is a flowchart illustrating the image processing process of step S12. First, the time and date at which the image data that was selected in step S10 was captured is read by the CPU 14 (step S120). Next, based on the current date of the clock 20, the amount of time that has elapsed since the imaging date of the image data that was read in step S120 is calculated by the CPU 14 (step S122).

Then, the CPU 14 determines whether or not a predetermined period (for example, one year, one month etc.) has elapsed since the imaging date (step S124), and if the predetermined period has not elapsed the CPU 14 ends the image processing. In contrast, if the predetermined period has elapsed, predetermined processing is performed by the image filter 24 when creating image data (reproduced image) for display on the display device 26 (step S126). Here, the contents of processing executed on the reproduced image in step S126 is, for example, processing that makes the image appear old by applying a sepia or gray filter or by discoloring the image, processing that alters (lowers) the lightness, saturation, hue, resolution, or contrast of the image, or processing that compresses, reduces, or applies traces of vermiculation, or spots or crosses or the like to the image.

Returning to the description of the flowchart of FIG. 2, the operation then proceeds to step S14 to display the reproduced image on the display device 26. Thus, the user can readily grasp the age of the image data at the time of image reproduced, facilitating arrangement of the image data.

In step S126 of the first embodiment, different processing may be executed on the reproduced image in accordance with the number of days that have elapsed since the imaging date. For example, the greater the number of days since the imaging date for a particular reproduced image, the deeper the color of the sepia filter may be made, or the parameters for changing lightness and so forth may be increased or the traces of vermiculation may be made greater. Thus, it will be easier for the user to grasp the age of the image data.

Figure 4:
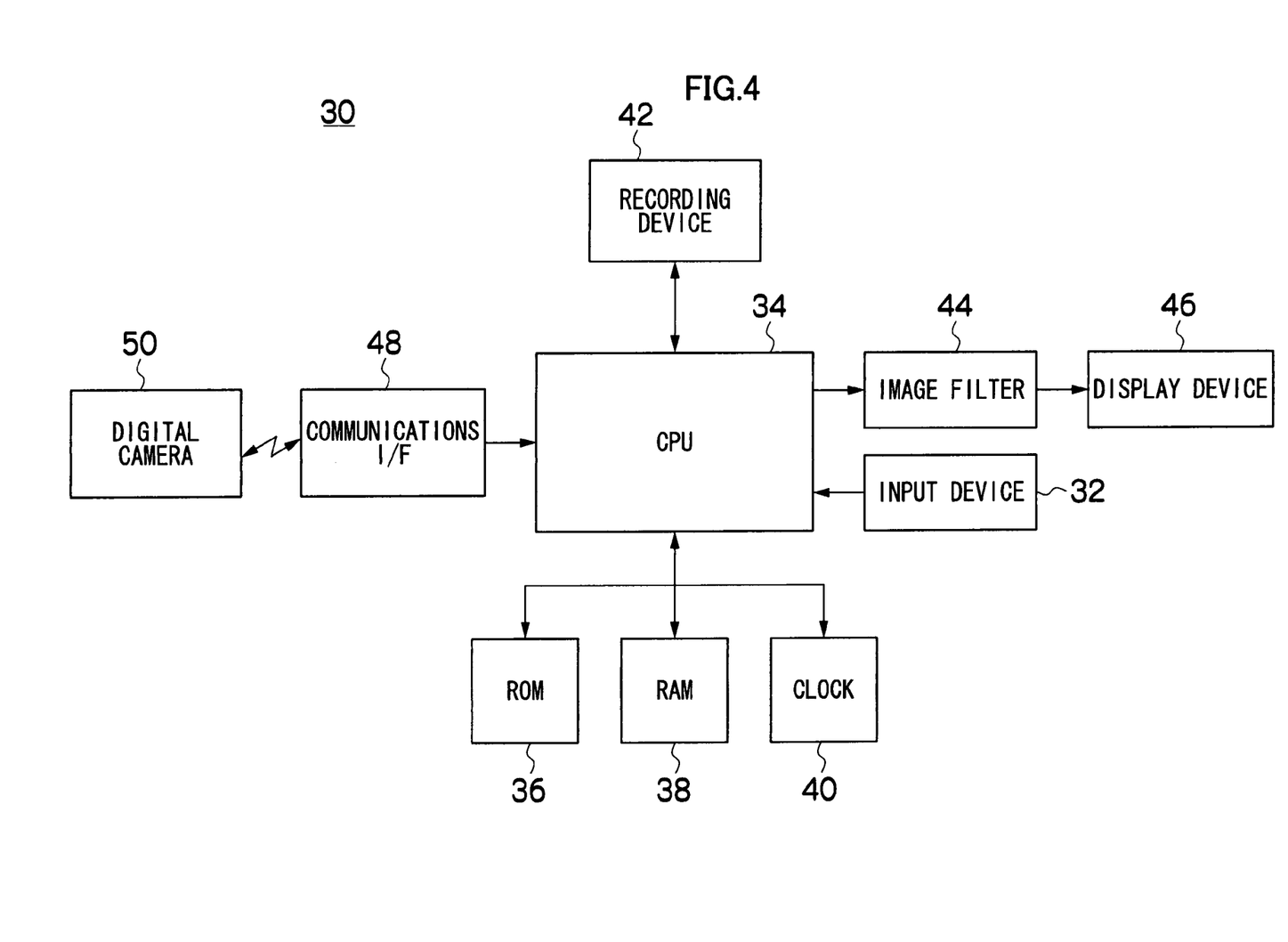
FIG. 4 is a block diagram showing another example of an image processing apparatus.

Further, although a digital camera has been taken as an example of the image processing apparatus 10, for example, the image processing apparatus of the present invention can also be applied to a computing machine such as a personal computer (PC) or a personal digital assistant (PDA), or a storage device or the like. FIG. 4 is a block diagram showing another example of an image processing apparatus.

An image processing apparatus 30 shown in FIG. 4 comprises an input device 32, a CPU 34, a ROM 36, a RAM 38, a clock 40, a recording device 42, a display device 46 that is connected to a CPU 34 through an image filter 44, and a communications I/F (interface) 48.

The input device 32 is, for example, a pointing device such as a mouse, or a keyboard. The recording device 42 is a device for storing image data or the like, and for example is a recording medium such as a hard disk or a CD-R. The communications I/F 48 is a device for communicating with a digital camera 50, and the image processing apparatus 30 reads image data that was stored in the digital camera 50 through the communications I/F 48. The CPU 34 and so forth are the same as those in the example of FIG. 1, and thus a description of these components is omitted here.

In the first embodiment, the kinds of processing described above may also be executed on data (documentation data and the like) created by a predetermined application. For example, when displaying documentation data that was created using word processing software, processing such as application of a filter, changing the lightness and the like or adding traces of vermiculation and so on as described above may be applied to the data in accordance with the period of elapsed time since creation of the documentation data. Thus, the age of the documentation data will be apparent to the user at a glance, making management thereof easier.

Figure 5:
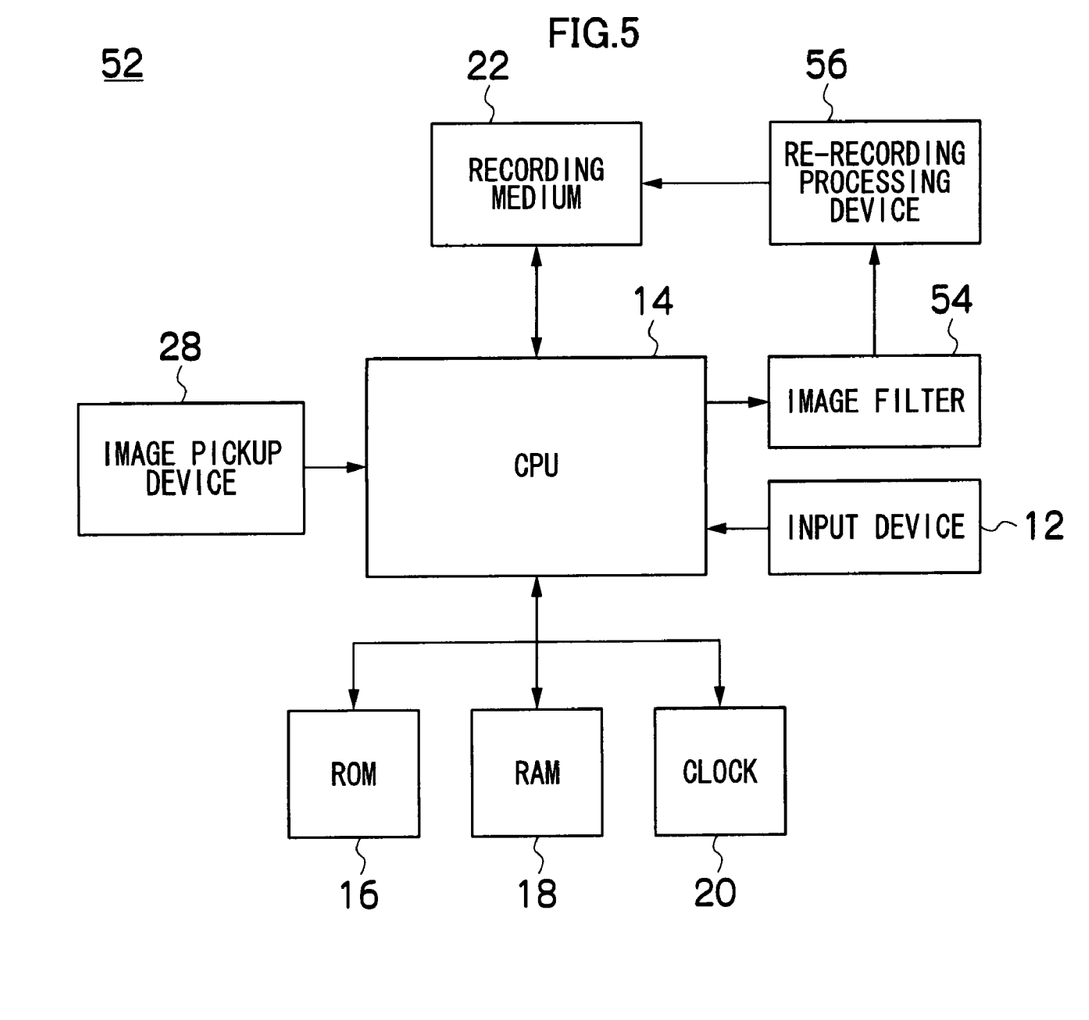
FIG. 5 is a block diagram showing the image processing apparatus of the second embodiment of the present invention.

Further, although image processing was performed on a reproduced image in the first embodiment, the image processing may also be performed on the image data itself or a thumbnail image. FIG. 5 is a block diagram showing the image processing apparatus of the second embodiment of the present invention.

As shown in FIG. 5, an image processing apparatus 52 of the second embodiment comprises an image filter 54 and a re-recording processing device 56. The image filter 54 is a device for converting image data stored in the recording medium 22 into an image for reproduced or a thumbnail display image, as well as for executing predetermined processing on image data. The re-recording processing device 56 is a device for re-storing image data that was processed by the image filter on the recording medium 22. In this connection, since the configuration and so forth of the input device 12 and other components shown in FIG. 5 are the same as those in the first embodiment (FIG. 1), they are denoted by the same symbols and a description of these components is omitted here.

Figure 6:
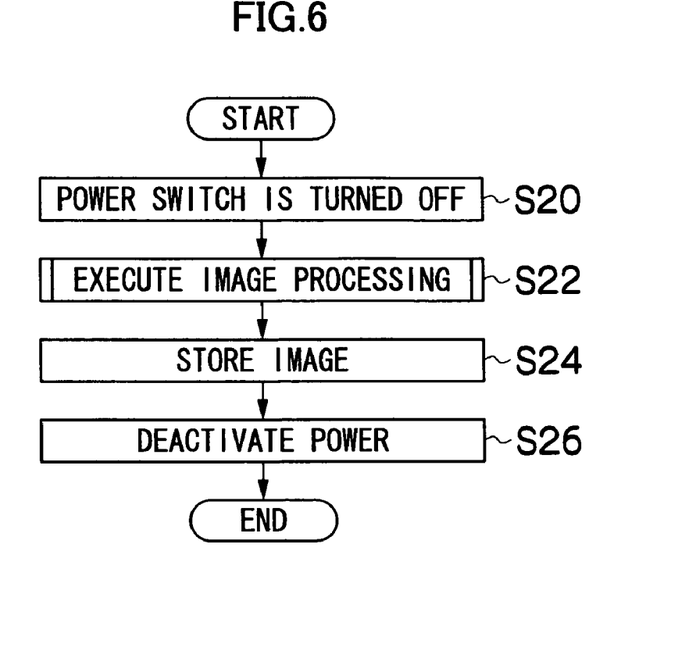
FIG. 6 is a flowchart illustrating the image processing method of the second embodiment of the present invention.

Next, a method of processing image data using the image processing apparatus 52 is described. FIG. 6 is a flowchart illustrating the image processing method of the second embodiment of the present invention.

Initially, when the power switch of the input device 12 is turned off (step S20), the image processing operation proceeds to step S22.

Figure 7:
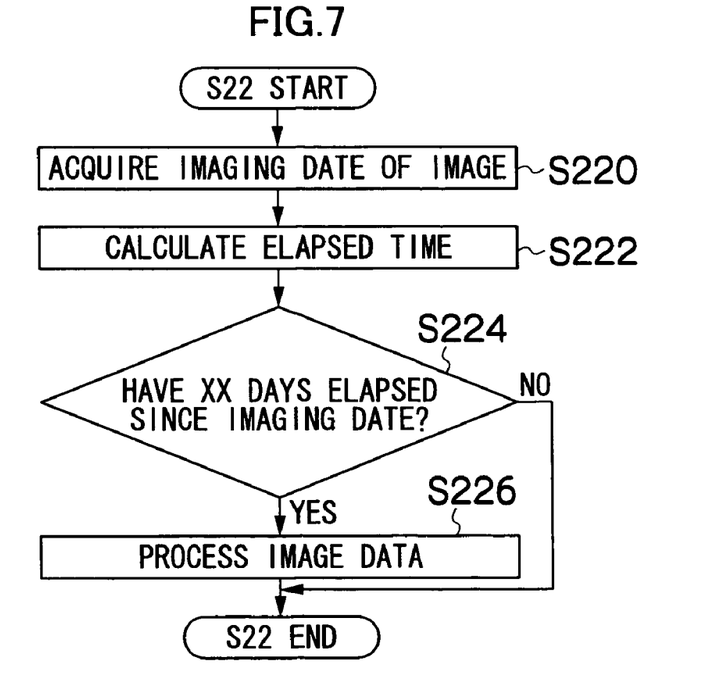
FIG. 7 is a flowchart illustrating the image processing process of step S22.

FIG. 7 is a flowchart illustrating the image processing process of step S22. First, the time and date when each image data stored on the recording medium 22 was captured is read by the CPU 14 (step S220). Next, based on the current date of the clock 20, the period of elapsed time since the imaging date of each image data that was read in step S220 is calculated by the CPU 14 (step S222).

The CPU 14 then determines whether or not a predetermined period (for example, one year, one month etc.) has elapsed since the imaging date for each image data (step S224), and image processing is not performed for image data for which the predetermined period has not elapsed. In contrast, predetermined processing is performed by the image filter 54 on image data for which the predetermined period has elapsed (step S226). Since the contents of processing executed on image data in step S226 are the same as those in the first embodiment, a description thereof is omitted here.

Returning to the description of the flowchart of FIG. 6, the operation then proceeds to step S24, in which images that underwent processing in the above step S226 are stored by overwriting on the recording medium 22. The power of the image processing apparatus 52 is then deactivated (step S26). Thus, a user can readily grasp the age of image data stored on the recording medium 22, facilitating management of the image data.

In this connection, although in step S24 above, the image data that was processed is then stored by being overwritten on the original data, the image data that was processed may be stored separately from the original data (for example, processed image data may be stored on the recording medium 22, and the original data may be stored in a separate folder or on a removable medium or the like).

Figure 8:
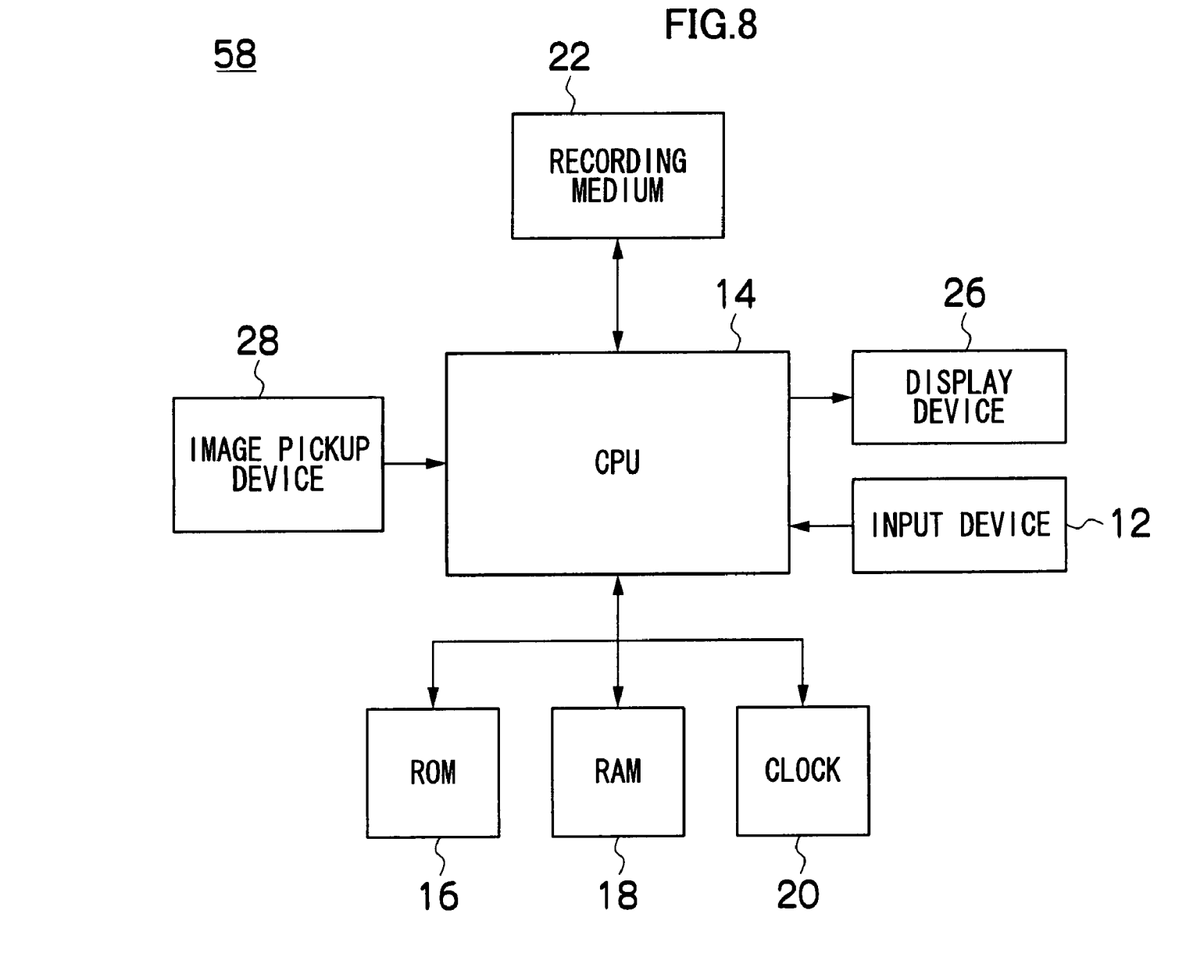
FIG. 8 is a block diagram showing the image processing apparatus of the third embodiment of the present invention.

Next, an image processing apparatus according to the third embodiment of the present invention will be described. FIG. 8 is a block diagram showing the image processing apparatus of the third embodiment of the present invention. In an image processing apparatus 58 shown in FIG. 8, since the input device 12 and other components are the same as those in the first embodiment (FIG. 1), they are denoted by the same symbols and a description of these components is omitted here.

Figure 9:
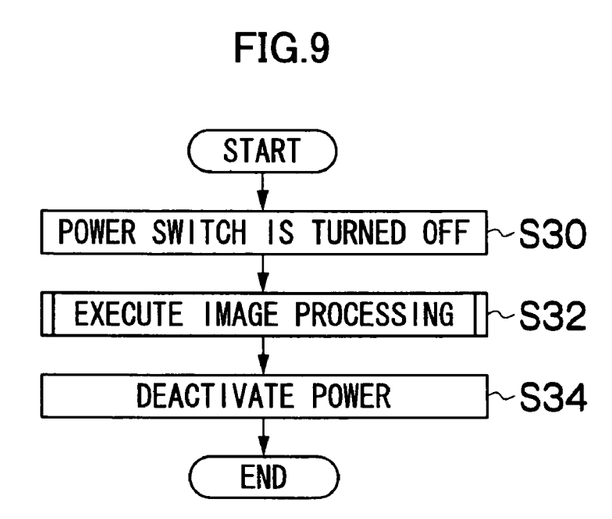
FIG. 9 is a flowchart illustrating the image processing method of the third embodiment of the present invention.

Next, a method of processing image data using the image processing apparatus 58 is described. FIG. 9 is a flowchart illustrating the image processing method of the third embodiment of the present invention.

Initially, when the power switch of the input device 12 is turned off (step S30), the image processing operation proceeds to step S32.

Figure 10:
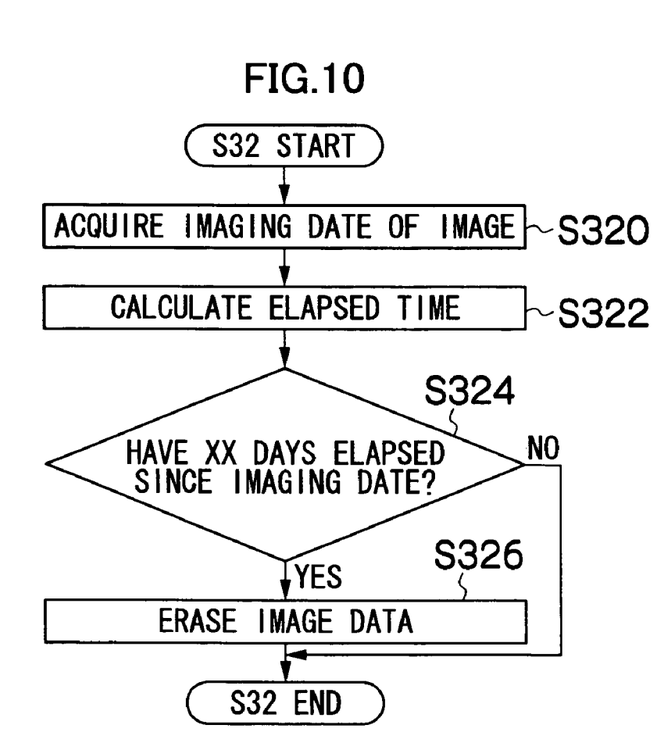
FIG. 10 is a flowchart illustrating the image processing process of step S32.

FIG. 10 is a flowchart illustrating the image processing process of step S32. First, the time and date when each image data stored on the recording medium 22 was captured is read by the CPU 14 (step S320). Next, based on the current date of the clock 20, the period of elapsed time since the imaging date of each image data that was read in step S320 is calculated by the CPU 14 (step S322).

The CPU 14 then determines whether or not a predetermined period (for example, one year, one month, etc.) has elapsed since the imaging date for each image data (step S324), and image data for which the predetermined period has not elapsed is stored as it is on the recording medium 22. In contrast, image data for which the predetermined period has elapsed is erased (step S326).

Returning to the description of the flowchart of FIG. 9, the operation then proceeds to step S34, in which the power of the image processing apparatus 58 is deactivated. Thus, since old data that is stored on the recording medium 22 is automatically erased, the management of image data is facilitated.

In this connection, when erasing image data from the recording medium 22 in step S34 above, the image data may be stored on a separate removable medium or the like. Further, a configuration may be adopted that allows tag information or a flag or the like to be set for image data that the user does not want to erase so that the image data will continue to be stored even after the predetermined period has elapsed, or image data that the user does not want to erase may be transferred to a "Favorites" folder or the like for long-term storage.

In the above second and third embodiments, although image processing is performed at the time the power switch is turned off, the present invention is not limited thereto and, for example, image processing may be performed when the power is on, or may be performed at a suitable timing such as each time image-taking is conducted and image data is newly stored. In addition, the image processing apparatuses (52, 58) may be provided with a dedicated input switch for causing the execution of image processing.

Furthermore, although a digital camera was taken as an example of the image processing apparatus (52, 58) in the above second and third embodiments, similarly to the first embodiment, the image processing apparatus of these embodiments can also be applied to, for example, a computing machine such as a personal computer (PC) or a personal digital assistant (PDA), or a storage device or the like. In this case, the above processing may also be performed for data (documentation data and the like) that was created by a predetermined application.

What is claimed is:

1. An image processing apparatus, comprising:
    an image acquisition device that acquires image data from an image recording device on which the image data was recorded;
    a date and time information reading device that reads date and time information of the image data;
    an image display device that displays a reproduced image of the image data;
    an image selection device that selects image data displayed on the image display device; and
    an image data processing device that, based on the date and time information that was acquired by the date and time information reading device, performs predetermined processing on the reproduced image when the predetermined period has elapsed since the image data was captured,
    wherein said predetermined processing is at least one kind of processing selected from the group including: processing that applies a sepia or gray filter; processing that alters lightness, saturation, hue, resolution, or contrast; and processing that applies traces of vermiculation, or spots or crosses to the reproduced image or the image data,
    wherein in the case that the processing that applies a sepia or gray filter is performed, the greater the number of days since the image data was captured, the deeper the color of the sepia or gray filter may be made,
    wherein in the case that the processing that alters lightness, saturation, hue, resolution, or contrast is performed, the greater the number of days since the image data was captured, the larger the parameters for changing lightness, saturation, hue, resolution or contrast may be made,
    wherein in the case that the processing that applies traces of vermiculation, or spots or crosses is performed, the greater the number of days since the image data was captured, the greater the traces of vermiculation may be made.

2. The image processing apparatus according to claim 1, wherein when image data was selected by the image selection device, the date and time information reading device reads date and time information of the selected image data, and the image data processing device performs processing on the reproduced image or the image data based on the date and time information of the selected image data.

3. The image processing apparatus according to claim 1, further comprising:
    an audio data recording device that records audio data that was associated with the image data;

an audio output device that outputs the audio data that was associated with the image data during display of a reproduced image of the image data; and an audio processing device that performs predetermined processing on audio data in accordance with the period of elapsed time since the date and time that the image data was captured, based on the date and time information acquired by the date and time information reading device.

4. The image processing apparatus according to claim 3, wherein the audio processing device changes at least one element selected from the group including sound volume and sound pitch.

5. The image processing apparatus according to claim 4, wherein when image data was selected by the image selection device, the audio processing device performs predetermined processing on the audio output.

6. The image processing apparatus according to claim 3, wherein when image data was selected by the image selection device, the audio processing device performs predetermined processing on the audio output.

7. The image processing apparatus according to claim 1, further comprising:
a documentation data recording device that records documentation data; and
a data processing device that performs predetermined processing on the documentation data or erases the documentation data in accordance with the period of elapsed time since the date and time that the documentation data was stored, based on the date and time information acquired by the date and time information reading device.

8. An image processing apparatus, comprising:
an image recording device that records image data;
a date and time information reading device that reads date and time information of the image data;
an image data processing device that, based on the date and time information that was acquired by the date and time information reading device, performs predetermined processing on the image data in when the predetermined period has elapsed since the image data was captured,
wherein said predetermined processing is at least one kind of processing selected from the group including: processing that applies a sepia or gray filter; processing that alters lightness, saturation, hue, resolution, or contrast; and processing that applies traces of vermiculation, or spots or crosses to the reproduced image or the image data,
wherein in the case that the processing that applies a sepia or gray filter is performed, the greater the number of days since the image data was captured, the deeper the color of the sepia or gray filter may be made,
wherein in the case that the processing that alters lightness, saturation, hue, resolution, or contrast is performed, the greater the number of days since the image data was captured, the larger the parameters for changing lightness, saturation, hue, resolution or contrast may be made;
wherein in the case that the processing that applies traces of vermiculation, or spots or crosses is performed, the greater the number of days since the image data was captured, the greater the traces of vermiculation may be made; and
an image re-recording device that causes image data that underwent the predetermined processing to be re-recorded by the image recording device.

9. The image processing apparatus according to claim 8, wherein when image data was selected by the image selection device, the date and time information reading device reads date and time information of the selected image data, and the image data processing device performs processing on the reproduced image or the image data based on the date and time information of the selected image data.

10. The image processing apparatus according to claim 8, further comprising:
an audio data recording device that records audio data that was associated with the image data;
an audio output device that outputs the audio data that was associated with the image data during display of a reproduced image of the image data; and
an audio processing device that performs predetermined processing on audio data in accordance with the period of elapsed time since the date and time that the image data was captured, based on the date and time information acquired by the date and time information reading device.

11. The image processing apparatus according to claim 10, wherein the audio processing device changes at least one element selected from the group including sound volume and sound pitch.

12. The image processing apparatus according to claim 11, wherein when image data was selected by the image selection device, the audio processing device performs predetermined processing on the audio output.

13. The image processing apparatus according to claim 10, wherein when image data was selected by the image selection device, the audio processing device performs predetermined processing on the audio output.

14. The image processing apparatus according to claim 8, further comprising:
a documentation data recording device that records documentation data; and
a data processing device that performs predetermined processing on the documentation data or erases the documentation data in accordance with the period of elapsed time since the date and time that the documentation data was stored, based on the date and time information acquired by the date and time information reading device.

15. A computer readable medium having stored thereon a computer executable program for image processing, the computer executable program when executed causes a computer to implement the functions of:
acquiring image data from an image recording device on which the image data is recorded;
reading date and time information of the image data;
displaying a reproduced image of the image data;
selecting the displayed image data; and
performing predetermined processing on the reproduced image when the predetermined period has elapsed since the image data was captured,
wherein said predetermined processing is at least one kind of processing selected from the group including: processing that applies a sepia or gray filter; processing that alters lightness, saturation, hue, resolution, or contrast; and processing that applies traces of vermiculation, or spots or crosses to the reproduced image or the image data, based on the date and time information that was read,
wherein in the case that the processing that applies a sepia or gray filter is performed, the greater the number of days since the image data was captured, the deeper the color of the sepia or gray filter may be made, wherein in the case that the processing that alters lightness, saturation, hue, resolution, or contrast is performed, the greater the number of days since the image data was captured, the larger the parameters for changing lightness, saturation, hue, resolution or contrast may be made, wherein in the case that the processing that applies traces of vermiculation, or spots or crosses is performed, the greater the number of days since the image data was captured, the greater the traces of vermiculation may be made.

16. A computer readable medium having stored thereon a computer executable program for image processing, the computer executable program when executed causes a computer to implement the functions of:

recording image data;

reading date and time information of the image data;

performing predetermined processing on the image data when the predetermined period has elapsed since the image data was captured, wherein said predetermined processing is at least one kind of processing selected from the group including: processing that applies a sepia or gray filter; processing that alters lightness, saturation, hue, resolution, or contrast; and processing that applies traces of vermiculation, or spots or crosses to the reproduced image or the image data, based on the date and time information that was read, wherein in the case that the processing that applies a sepia or gray filter is performed, the greater the number of days since the image data was captured, the deeper the color of the sepia or gray filter may be made, wherein in the case that the processing that alters lightness, saturation, hue, resolution, or contrast is performed, the greater the number of days since the image data was captured, the larger the parameters for changing lightness, saturation, hue, resolution or contrast may be made, wherein in the case that the processing that applies traces of vermiculation, or spots or crosses is performed, the greater the number of days since the image data was captured, the greater the traces of vermiculation may be made; and re-recording the image data that underwent the predetermined processing.

* * * * *